US010491557B1

(12) United States Patent
Lee et al.

(10) Patent No.: US 10,491,557 B1
(45) Date of Patent: Nov. 26, 2019

(54) MANAGING NETWORK EXPANSION

(71) Applicant: Microsoft Technology Licensing, LLC, Redmond, WA (US)

(72) Inventors: Thomas Michael Lee, San Francisco, CA (US); Xue Yu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 15/499,032

(22) Filed: Apr. 27, 2017

(51) Int. Cl.
*H04L 12/58* (2006.01)
*H04L 29/06* (2006.01)
*G06Q 10/06* (2012.01)
*G06Q 50/00* (2012.01)

(52) U.S. Cl.
CPC ......... *H04L 51/32* (2013.01); *G06Q 10/0637* (2013.01); *G06Q 10/063112* (2013.01); *G06Q 50/01* (2013.01); *H04L 51/04* (2013.01); *H04L 65/1063* (2013.01)

(58) Field of Classification Search
CPC ............. H04L 65/403; G06F 16/24578; G06F 16/285; G06F 16/90324
See application file for complete search history.

(56) References Cited

U.S. PATENT DOCUMENTS

| 8,892,651 B1* | 11/2014 | Goldman | G06Q 50/01 709/204 |
| 2002/0194112 A1* | 12/2002 | dePinto | G06Q 10/063112 705/37 |
| 2012/0245887 A1* | 9/2012 | Spears | G06Q 30/02 702/179 |
| 2013/0227384 A1* | 8/2013 | Good | H04L 67/10 715/205 |
| 2013/0263020 A1* | 10/2013 | Heiferman | H04L 51/32 715/753 |
| 2014/0358606 A1* | 12/2014 | Hull | G06Q 10/063112 705/7.14 |
| 2015/0106164 A1* | 4/2015 | Thibeault | G06Q 10/0637 705/7.36 |
| 2016/0321761 A1* | 11/2016 | Lytkin | G06Q 50/01 |

* cited by examiner

*Primary Examiner* — Barbara B Anyan
(74) *Attorney, Agent, or Firm* — Schwegman Lundberg & Woessner, P.A.

(57) ABSTRACT

This disclosure relates to systems and methods for managing network expansion. A method includes receiving an indicator that identifies a goal, identifying a target organization at an online social networking service to satisfy the goal, ranking members of the online social networking service that are also members of the target organization according to their respective ability to influence satisfaction of the goal, determining a connection path to one of the higher ranked members, and recommending, to a member, a connection to a next member identified by the connection path.

20 Claims, 9 Drawing Sheets

MANAGING NETWORK EXPANSION

TECHNICAL FIELD

The subject matter disclosed herein generally relates to an electronic network of users and, more particularly, to strategically expanding a member's electronic network of connections pursuant to the member's goals.

BACKGROUND

As use of modern technology increases, electronic networks are used for a wider variety of purposes. Members of various electronic networks connect in different ways and operate in the network to pursue their individual goals. Expanding the electronic social network of connections in pursuit of one member's goal may adversely affect goals for other members. Managing expansion of the electronic network in pursuit of the individual goals of the members is a challenge.

BRIEF DESCRIPTION OF THE DRAWINGS

Some embodiments are illustrated by way of exam e and not limitation in the figures of the accompanying drawings.

DETAILED DESCRIPTION

The description that follows includes systems, methods, techniques, instruction sequences, and computing machine program products that embody the inventive subject matter. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In one example embodiment, a system is configured to receive, from a member of an online social networking service, an indicator that identifies a goal. The system then identifies a target organization at the online social networking service to address the goal and ranks members of that target organization according to their respective ability to influence satisfaction of the goal.

The system then ranks members of the online social networking service that are also members of the target organization according to their respective ability to influence satisfaction of the goal and their respective connection distance to the member. The system then determines a connection path, through members of the online social networking service, to one of the higher ranked members and recommends a connection to a next member identified by the connection path.

In one example embodiment, a stated goal is the sale of auto parts. In response to receiving the stated goal via an electronic computing device being used by the member, the system identifies a target organization at the online social networking service that distributes auto parts and ranks members of the target organization, in one example, a salesperson of auto parts for the target organization that is a member of the online social networking service is ranked higher than a clerk or secretary because the salesperson is in a position to influence sales of auto parts. Accordingly, the system determines a network connection path from the member to the purchaser at the auto parts distribution organization and recommends connection with a member along the network connection path.

In this way, a member of the online social networking service is quickly and directly electronically connected with other members of an online social networking service that will more likely be able to address the member's goals or purpose of connecting with the online social networking service. Furthermore, the member's social network expansion may be limited to those connections that further the member's ambitions (e.g., specifically indicated goals or purposes).

Figure 1:
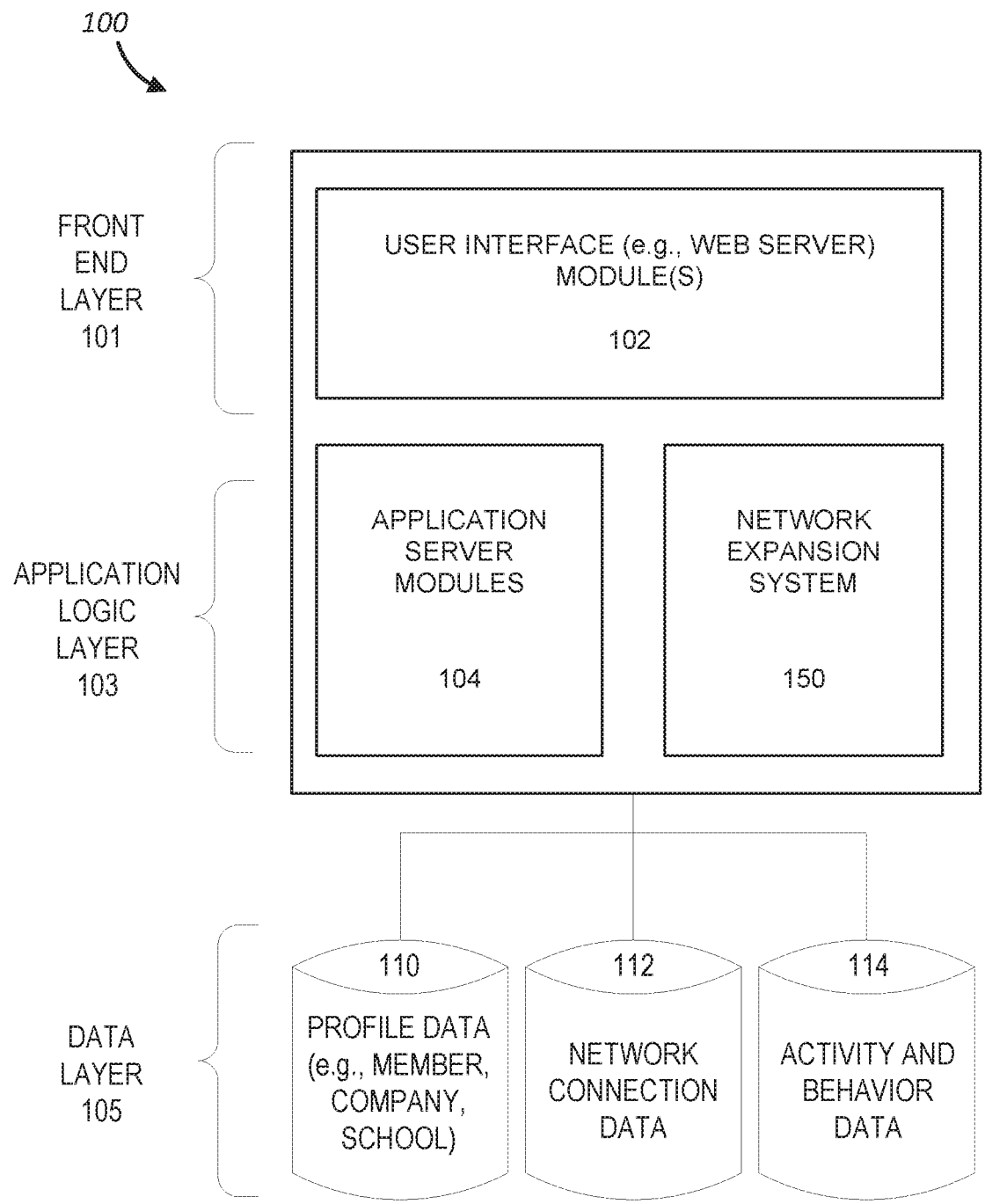
FIG. 1 is a block diagram illustrating various components or functional modules of an online social networking service, in an example embodiment.

FIG. 1 is a block diagram illustrating various components or functional modules of an online social networking service 100, in an example embodiment. In one example, the online social networking service 100 includes a network expansion system 150 that performs many of the operations described herein.

A front end layer 101 consists of one or more user interface modules (e.g., a web server) 102; which receive requests from various client computing devices and communicate appropriate responses to the requesting client devices. In one example embodiment, the front end layer 101 provides an electronic interface allowing a member to select a specific goal. For example, the user interface module(s) 102 may receive requests in the form of Hypertext Transfer Protocol (HTTP) requests, or other web-based application programming interface (API) requests. In another example, the front end layer 101 receives requests or indicators from an application executing via a member's mobile computing device.

An application logic layer 103 includes various application server modules 104, which, in conjunction with the user interface module(s) 102, may generate various user interfaces (e.g., web pages, applications, etc.) with data retrieved from various data sources in a data layer 105. In one example embodiment, the application logic layer 103 includes the network expansion system 150 that is configured to perform many of the operations described herein.

In some examples, individual application server modules 104 may be used to implement the functionality associated with various services and features of the online social networking service 100. For instance, the ability of an organization to establish a presence in the social graph of the online social networking service 100, including the ability to establish a customized web page on behalf of an organization, and to publish messages or status updates on behalf of an organization, may be services implemented in independent application server modules 104. Similarly, a variety of other applications or services that are made available to members of the online social networking service 100 may be embodied in their own application server modules 104. Alternatively, various applications may be embodied in a single application server module 104.

As illustrated, the data layer 105 includes, but is not necessarily limited to, several databases 110, 112, 114, such as a database 110 for storing profile data, including both member profile data and profile data for various organizations, name cluster data, member interactions, member queries, or the like. In one example embodiment, the database 114 stores member activity and behavior data and the database 112 stores network connection data.

Consistent with some examples, when a person initially registers to become a member of the online social networking service 100, the person may be prompted to provide some personal information, such as his or her name, age (e.g., birthdate), gender, sexual orientation, interests, hobbies, contact information, home town, address, spouse's and/or family members' names, educational background (e.g., schools, majors, matriculation and/or graduation dates, etc.), occupation, employment history, skills, religion, professional organizations, and other properties and/or characteristics of the member, in another example embodiment, the member is requested to provide a goal or purpose of membership. This information is stored, for example, in the database 110. Similarly, when a representative of an organization initially registers the organization with the online social networking service 100, the representative may be prompted to provide certain information about the organization. This information may be stored, for example, in the database 110, or another database (not shown).

The online social networking service 100 may provide a broad range of other applications and services that allow members the opportunity to share and receive information, which is often customized to the interests of the member. For example, in some examples, the online social networking service 100 may include a message sharing application that allows members to upload and share messages with other members. In some examples, members may be able to self-organize into groups, or interest groups, organized around subject matter or a topic of interest. In some examples, the online social networking service 100 may host various job listings providing details of job openings within various organizations.

As members interact with the various applications, services, and content made available via the online social networking service 100, information concerning content items interacted with, such as by viewing, playing, and the like, may be monitored, and information concerning the interactions may be stored, for example, as indicated in FIG. 1 by the database 114. In one example embodiment, the interactions are in response to receiving a message requesting the interactions.

Although not shown, in some examples, the online social networking service 100 provides an API module via which third-party applications can access various services and data provided by the online social networking service 100. For example, using an API, a third-party application may provide a user interface and logic that enables the member to submit and/or configure a set of rules used by the network expansion system 150. Such third-party applications may be browser-based applications or may be operating system specific. In particular, some third-party applications may reside and execute on one or more mobile devices (e.g., phones or tablet computing devices) having a mobile operating system.

Figure 2:
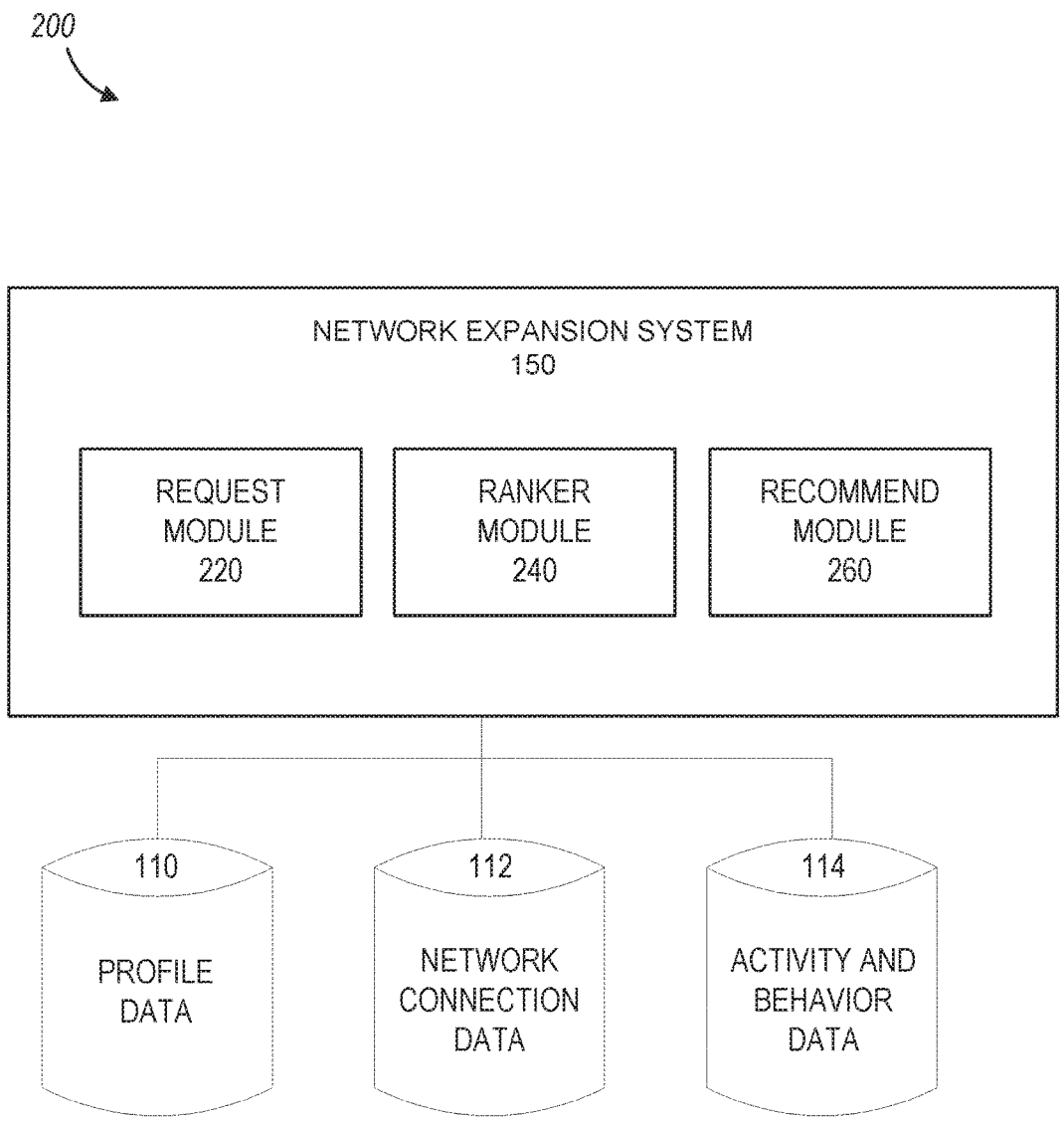
FIG. 2 is a block diagram illustrating a system for expanding a member's network, according to one example embodiment.

FIG. 2 is a block diagram illustrating a system 200 for expanding a member's network, according to one example embodiment. In this example embodiment, the system 200 includes the network expansion system 150 connected to the databases 110, 112, and 114. Furthermore, the network expansion system 150 includes a request module 220, a ranker module 240, and a recommend module 260.

In one example embodiment, the request module 220 is configured to receive, from a member of an online social networking service (e.g., the online social networking service 100), an indicator that identifies a goal. In one example embodiment, a goal is to connect with potential purchasers of a product a member is trying to sell. In another example embodiment, a goal is to connect with a member that is in a position to assist in passing legislation. In another example embodiment, a goal is to connect with a member that can greater assist the member in managing a charitable organization, managing other members, or other stated purposes.

In certain examples, a goal is a desired professional attainment, such as, but not limited to, a career advancement goal, a sales goal, a marketing goal, a connection goal, or the like. In one example, a goal is to be connected with CEO's of large corporations. In another example, a goal is to established communication channels with leaders of small businesses. In one example, a goal is to discover and connect with other members having similar interests.

In one example embodiment, the request module 220 receives the indicator by parsing an audio signal that includes a member's voice. The request module 220 may then in turn match the indicator with an indicator in a database of predefined goals. In another example embodiment, the request module 220 receives the indicator by loading the indicator from the profile of the member. In this example embodiment, the user interface is configured to offer a selection of goals that the member can select. For example, when the member registers as a member of the online social networking service 100, the user interface requests that the member select a goal.

According to one example embodiment, after receiving a goal for the member, the request module 220 identifies the target organization at the online social networking service 100 that may be able to satisfy the goal. In one example embodiment, the goal is the sale of auto-parts, and in response, the request module 220 identifies members or member organizations of the online social networking service 100 that sells auto parts. According to certain examples, the request module 220 may perform term matching, goal matching, purpose matching, or any other techniques to match a goal of a member with a target organization at the online social networking service 100 that may be able to satisfy the goal.

In another example embodiment, the goal for the member specifically indicates a target organization. In one example, the goal is legal contract work for a specific law firm. In another example, the goal is technology licensing with a specific technology organization. In one example the goal identifies the target organization by name.

In one example embodiment, the request module 220 identifies the target organization by electronically searching through the database 110 (e.g., the member profiles) to find those member organizations that satisfy the member's goal. In one example, the member profiles include stated purposes, capabilities, or goals of a target organization. In other examples, the request module 220 identifies many target organizations.

In another example embodiment, the request module 220 identifies a target organization based on an organization type. In one example, as members join the online social networking service 100, the member (or member organizations) identify a type (e.g., a user interface for the online social networking service requests that the member (or member organization) select a type—e.g., an industry). In certain examples, types include auto parts sales, software development, marketing, financial services, or the like. In one example, a target organization selects a purpose from a predetermined set of purposes and the request module 220 identifies the target organization in response to the member selecting the same purpose (e.g., the member's goal matches the target organization's purpose).

After the request module 220 identifies one or more target organizations, in one example embodiment, the ranker module 240 ranks members of the online social networking service 100 that are also members of the target organization according to their respective ability to influence satisfaction of the goal and their respective connection distance to the member.

In one example, the member's goal is reputation management for businesses with less than 50 employees. In response, the request module 220 identifies many target organizations that have less than 50 employees, and the ranker module 240 ranks members of those target organizations. In certain examples, members of the target organizations are not in a position to influence reputation decisions, such as, but not limited to, janitors, secretaries, or other support staff. Other members of the target organization are in positions to influence reputation decisions, such as, but not limited to, CEOs, vice-presidents, managers, or other managerial type positions. Accordingly, the ranker module 240 ranks the members according to their influence.

In one examples, the ranker module 240 ranks CEOs and presidents highest, with other managerial personnel second highest, and other support staff being ranked lower. In one example, the ranker module 240 assigns a rank of one to CEOs, two for presidents, three for vice-presidents, four for managers, five for supervisors, six for engineers, seven for administrative assistants, and eight for janitors. Of course, other values may be used and this disclosure is not limited in this regard. In these examples, because a CEO is in a better position to satisfy the member's goal, the CEO is more highly ranked. In another example embodiment, the ranker module 240 looks up a member's position in an organization chart to determine the member's ability to influence decisions of a member organization.

In another example embodiment, the ranker module 240 increases a rank for members of the target organization that are more active on the online social networking service 100. In one example, the ranker module 240 increases a rank by one for each member of the target organization that is on average interacting with the online social networking service 100 on a daily basis. In such an example, although a CEO for a target organization may be more highly ranked because of position, the ranker module 240 increases a score for a manager in response to the manager being a more active member of the online social networking service 100. In one example, the ranker module 240 increases a score for the member by multiplying the score by 1.5, or another value greater than one. Of course, other values may be used and this disclosure is not limited in this regard.

In another example embodiment, the ranker module 240 increases a rank for members of the target organization that have a larger social network at the online social networking service 100. In one example, the ranker module 240 increases a rank by one for the member of the target organization with the largest number of connections at the online social networking service 100.

In one example embodiment, the ranker module 240 increases a rank for a member of the target organization that is more closely connected with the member's goal. In one example, a manager for the target organization is four connections away from the member and a president for the target organization is six connections away from the member. In response, the ranker module 240 increases the rank for the manager because the manager is more closely connected with the member according to the online social networking service 100.

In one example embodiment, the ranker module 240 increases a rank for a member of the target organization in response to receiving an indicator from the member that the member is in a position specifically capable of satisfying the goal. In one example, the member of the target organization indicates that he/she is responsible for sales of one or more products although the title of the member may not indicate any sales activities. In response, the ranker module 240 increases a rank for the member, or increases a score for the member.

In one example embodiment, the recommend module 260 determines a connection path, through members of the online social networking service 100, to one of the higher ranked members. In an example, the recommend module 260 determines a connection path, through members of the online social networking service 100, to the highest ranked member of the target organization. The recommend module 260, in another example embodiment, displays the connection path to the member, or identifies a next connection along the connection path. The recommend module 260 may also recommend, to the member, to request a connection with the member of the target organization that is next along the connection path.

In one example embodiment, the recommend module 260 displays a connection path in response to an open channel of communication between the member and the member of the target organization that is along the connection path. In one example embodiment, the recommend module 260, while the member, using a first computing device, is chatting with the member of the target organization, using a second computing device, causes a graphical user interface to display, using another section of the user interface being displayed on the first computing device, the connection path. Thus, without interrupting the current channel of communication, the member can see how the member with whom he/she is communicating may help connect with influential members of the target organization.

In one example embodiment, a member is a salesman with a goal of connecting with corporation A. In response to email communication between the member and another member of the online social networking service 100 that is more closely connected with corporation A, the recommend module 260 may determine another connection path from the member to corporation A that includes the another member, thus allowing the member to take advantage of a current connection with another member that may facilitate connecting with corporation A. Furthermore, because the connection path is displayed during the open communication channel, the member can discretely request connection with a next member along the connection path without having to open a new communication channel with the another member.

In one example embodiment, the member is in a call with a second member of the online social networking service 100 using a telephone having a display. By observing the connections between members and determining that the second member is more closely connected with a target organization, the recommend module 260 causes display of the recommended connection path via the display of the telephone while the member is talking with the second member. The recommend module 260 may cause this by transmission of network packets to the telephone that command the telephone to display the recommended connection path.

In another example embodiment, the recommend module 260 displays a connection path to a target organization in response to financial compensation. Thus, the recommend module 260 may limit production of recommended connection paths to those members with a sufficient financial commitment. In one example, the recommend module 260 connects members along the connection path to explicitly connect the member with the target organization, in response to the member paying a pre-determined sum of money for the connection.

Figure 3:
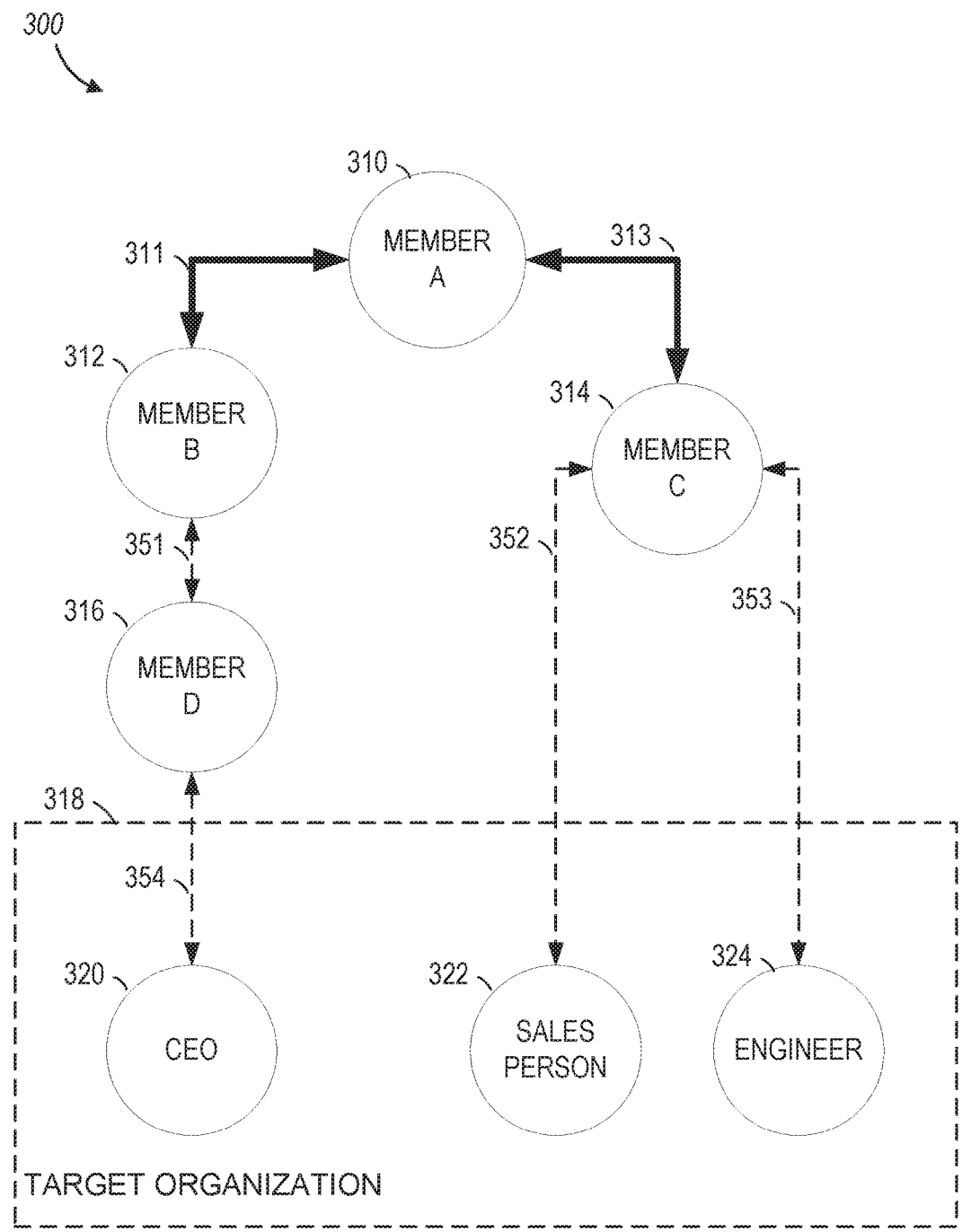
FIG. 3 is a block diagram illustrating a network, according to one example embodiment.

FIG. 3 is a block diagram illustrating a social network 300, according to one example embodiment. The social network 300 at least includes member A 310, member B 312, member C 314, and member D 316. The social network 300 may include many other members of the online social networking service 100 although these other members are not depicted in FIG. 3, Members of the target organization 318 (e.g., the CEO 320, a salesperson 322, and an engineer 324) are also members of the online social networking service 100 and connected to the social network 300.

In one example embodiment, the request module 220 determines that member A should be connected to the target organization 318 based, at least in part, on an indicated goal by the member A 310 as previously described. In one example, the ranker module 240 determines that member A 310 could be connected with the target organization 318 via member C 314. In this path, the ranker module 240 ranks member C as a two because the member A 310 may be connected with the target organization 318 by way of member C 314 using two paths (e.g., connections 313 and 352, or 313 and 353). In one example, the ranker module 240 increases the rank for the salesperson 322 in response to the salesperson 322 being in a position to fulfill the goal of the member 310.

In another example embodiment, the ranker module 240 determines that member A 310 may be connected with the target organization 318 through members B 312 and D 316. In this example, the ranker module 240 ranks the CEO 320 as a three because there are three social networking connections between the member 310 and the CEO 320. In one example embodiment, the ranker module 240 increases the rank for the CEO 320 because the CEO 320 is in a position to fulfill the member's 310 goal or purpose.

In one example embodiment, the salesperson 322 is ranked as a three because the salesperson 322 is connected to the member 310 through two potential connections and the salesperson 322 is in a position to fulfill the member's goal (e.g., for example, if the member's goal is sales). In another example embodiment, the CEO 320 is also in a position to fulfill the member's 310 goal, and the CEO 320 is more active using the online social networking service 100 and the ranker module 240 increases the rank for the CEO 320. Therefore, although the CEO's 320 distance from the member A 310 is more than the salesperson's 322, the ranker module 240, in this example embodiment, ranks the CEO 320 higher because of the CEO's activity level at the online social networking service 100.

In certain embodiment, the ranker module 240 increases a score for a member, and the highest ranked member is the member with the highest score. In other embodiment, the ranker module 240 decreases a score for a member, and the highest ranked member is the member with the lowest score. Of course, other mathematical variations may be used and this disclosure is not limited in this regard.

Figure 4:
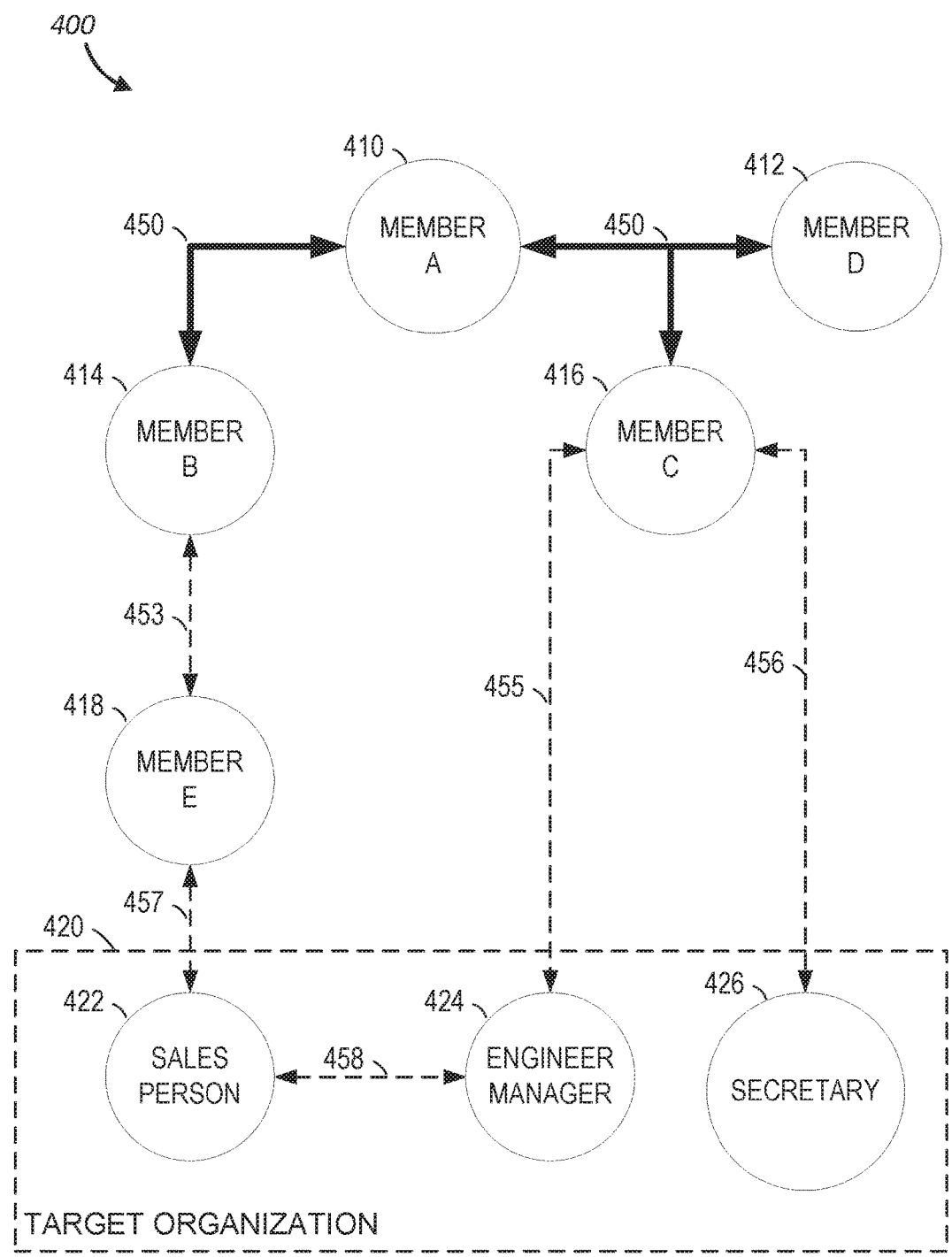
FIG. 4 is a block diagram illustrating another network, according to one example embodiment.

FIG. 4 is a block diagram illustrating another social network 400, according to one example embodiment. In this example embodiment, the social network 400 includes members A 410, B 414, C 416, and D 412. In this example embodiment, the members (A-D 410-416) are connected by connections 450. Of course, the social network 400 may include other members not depicted in FIG. 4.

In one example embodiment, the member A 410 has indicated a goal of electronic circuit board engineering and the ranker module 240 has identified the target organization 420 as an organization that can satisfy the goal (e.g., an organization that designs circuit boards). The ranker module 240 then ranks the members of the target organization (e.g., the salesperson 422, the engineer manager 424, and the secretary 426) according to their respective ability to influence satisfaction of the goal (e.g., able influence the selection of engineering contractors) In one example, because the goal involves engineering, the ranker module 240 determines that the engineer manager 424 should be more highly ranked than the salesperson 422 or the secretary 426. The recommend module 260 then determines a connection path, through member C 416 to the engineer manager 424.

In another example embodiment, the member C 416 may not be active (e.g., may connect to the online social networking service 100 less than 1 time per week) on the online social networking service 100 and the recommend module 260 determines the connection path to be through member B 414 (connection path 450), member E 418 (connection path 453), the salesperson 422 (connection path 457), and then to the engineer manager 424 (by way of connection path 458). The ranker module 240 may also more highly rank the salesperson 422 in response to member B 414 and member E 418 being more active on the online social networking service 100 than member C 416.

In one example embodiment, in response to an open communication channel between member A 410 and member C 416, the recommend module 260 displays the connection path 455. In response to an open communication channel between member A 410 and member B 414, the recommend module 260 displays the connection path (450, 453, 457, 458) through member B 414, member E 418, and the salesperson 422.

Therefore, based, at least in part, on the respective titles, the nature of their network connections, interaction frequency at the online social networking service 100, and/or network connection strength, the recommend module 260 determines a connection path between the member and a member of a target organization that is likely to be able to satisfy a goal for the member.

In another example embodiment; the recommend module 260 recommends that the member A 410 connect with member E 418 because member E 418 is a next member along the connection path between member B 414 and the engineer manager 424.

Figure 5:
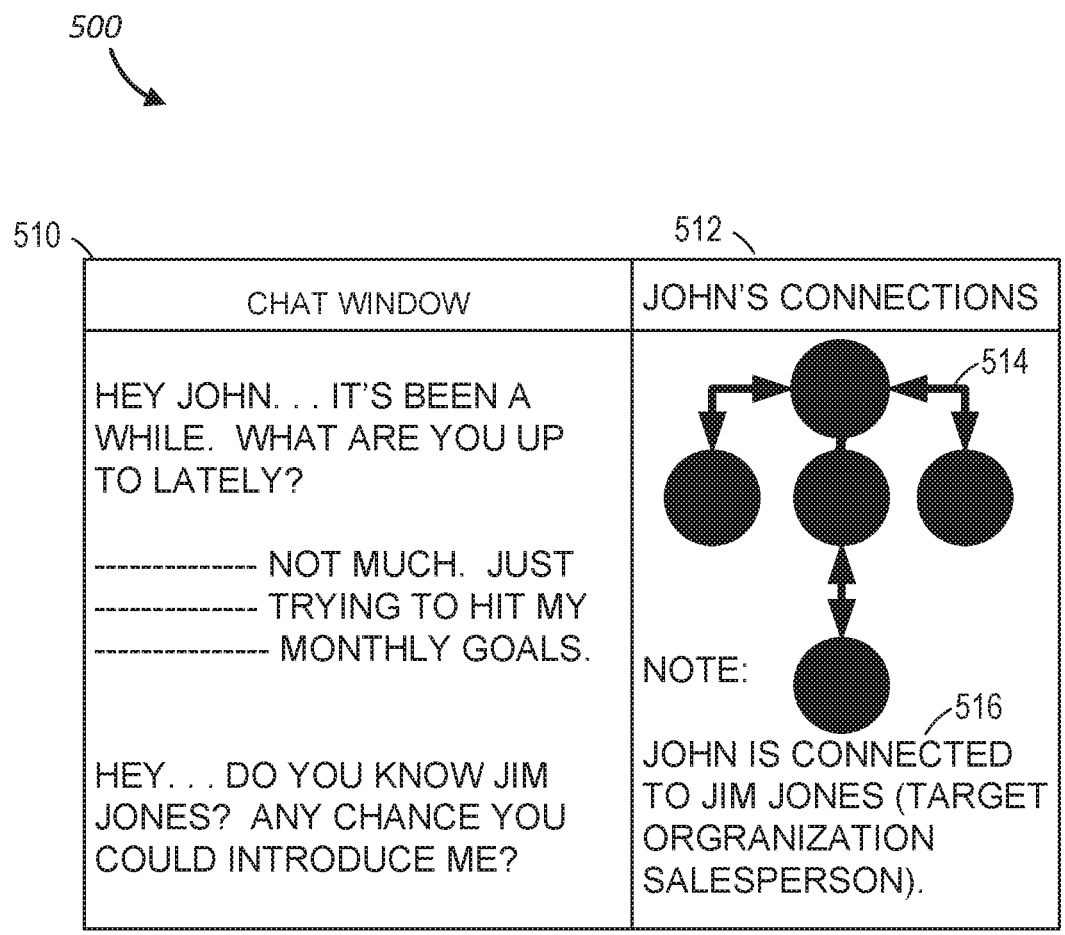
FIG. 5 is an illustration depicting one example embodiment of a user interface for expanding a member's network.

FIG. 5 is an illustration depicting one example embodiment of a user interface 500 for expanding a member's network. In this example embodiment, the user interface 500 includes a chat window 510 and a connection window 512.

In one example embodiment, a member has an open line of communication (the chat window 510) with another member named "John." Also, in this example embodiment, the member named "John" is connected to a member of a target organization. Accordingly; because "John" is connected to a member of the target organization, the recommend module 260 displays "John's" connection in a connection window 512. In one example, the recommend module 260 also indicates that "John" is connected to "Jim Jones" who is a salesperson for the target organization. In this example embodiment, because the member is presented with "John's" connections during an open channel of communication, the member may choose to request an introduction to "Jim Jones" in a more natural social situation.

Figure 6:
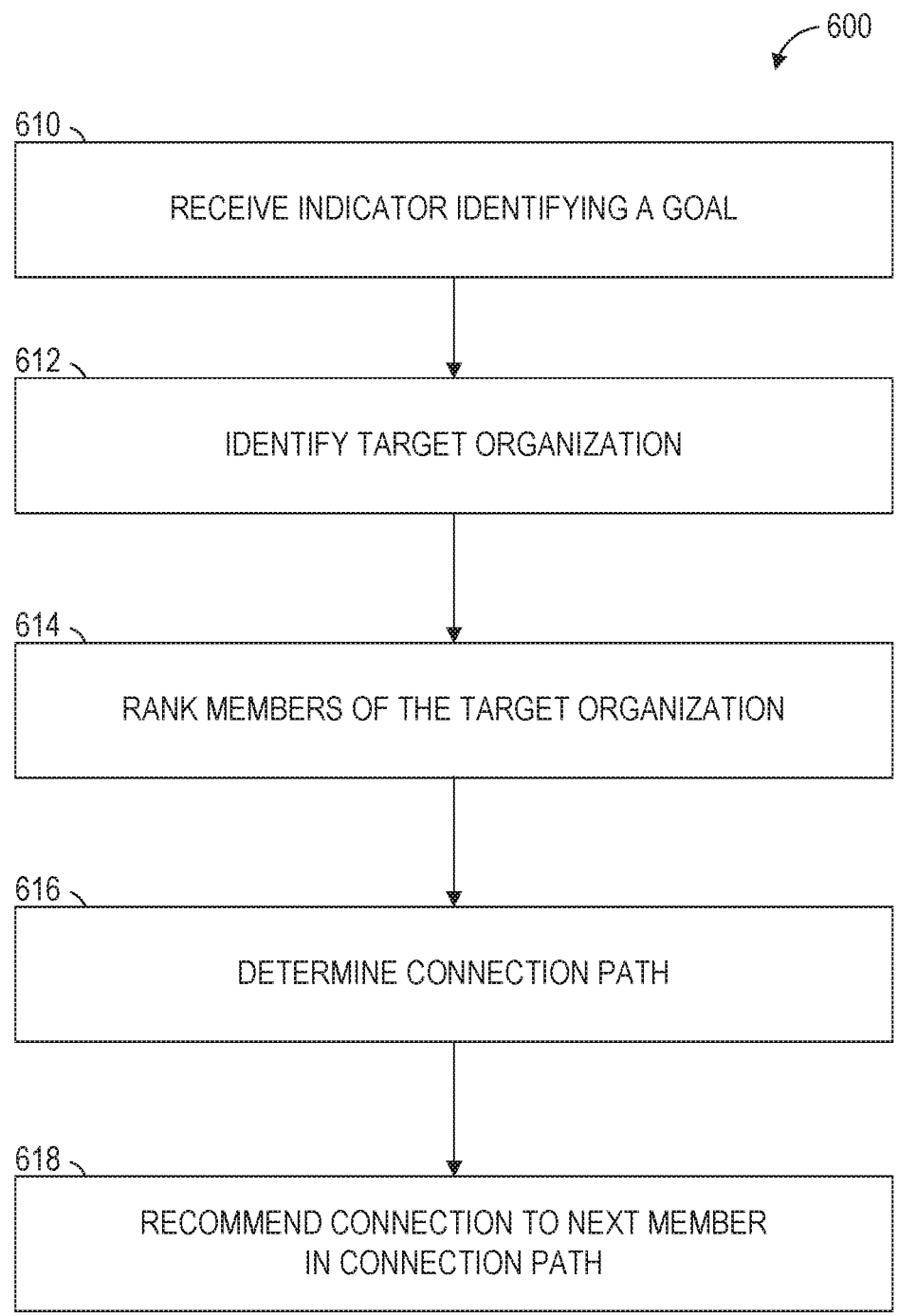
FIG. 6 is a flow chart diagram depicting one method of expanding a member's network, according to one example embodiment.

FIG. 6 is a flow chart diagram depicting one method of expanding a member's network, according to one example embodiment. Operations in the method 600 may be performed by modules described in FIG. 2 and are described by reference thereto.

In one example embodiment, the method 600 begins and at operation 610 with the request module 220 receiving, from a member of the online social networking service 100, an indicator that identifies a goal. In one example, the member selects a goal from a predefined set of goals via a user interface and the request module 220 receives the selection by the member.

The method 600 continues at operation 612 and the request module 220 identifies a target organization at the online social networking service 100 to satisfy the goal. In one example, the request module 220 selects one or more records from the database 110 to determine one or more member organizations that match the identified goal.

The method 600 continues at operation 614 and the ranker module 240 ranks members of the online social networking service 100 that are also members of the target organization according to their respective ability to influence satisfaction of the goal, in one example, the ranker module 240 determines a member's ability to influence satisfaction of the goal based, at least in part, on an employment title for the member.

In another example embodiment, the ranker module 240 uses the connection distance to rank the members of the online social networking service 100 and members of the target organization. In one example, the ranker module 240 scores each member of the target organization according to connection distance, title, connection strength (e.g., duration of the connection), or the like.

The method 600 continues at operation 616 and the recommend module 260 determines a connection path, through members of the online social networking service 100, to one of the higher ranked members, in one example, the recommend module 260 determines a connection path to the highest ranked member of the target organization by querying the database 112 for connections between the members.

The method 600 continues at operation 618 and the recommend module 260 recommends, to the member, a connection to a next member identified by the connection path. In one example, the connection path includes three other members of the online social networking service 100 and the recommend module 260 recommends that the member connect with the next member along the connection path.

Figure 7:
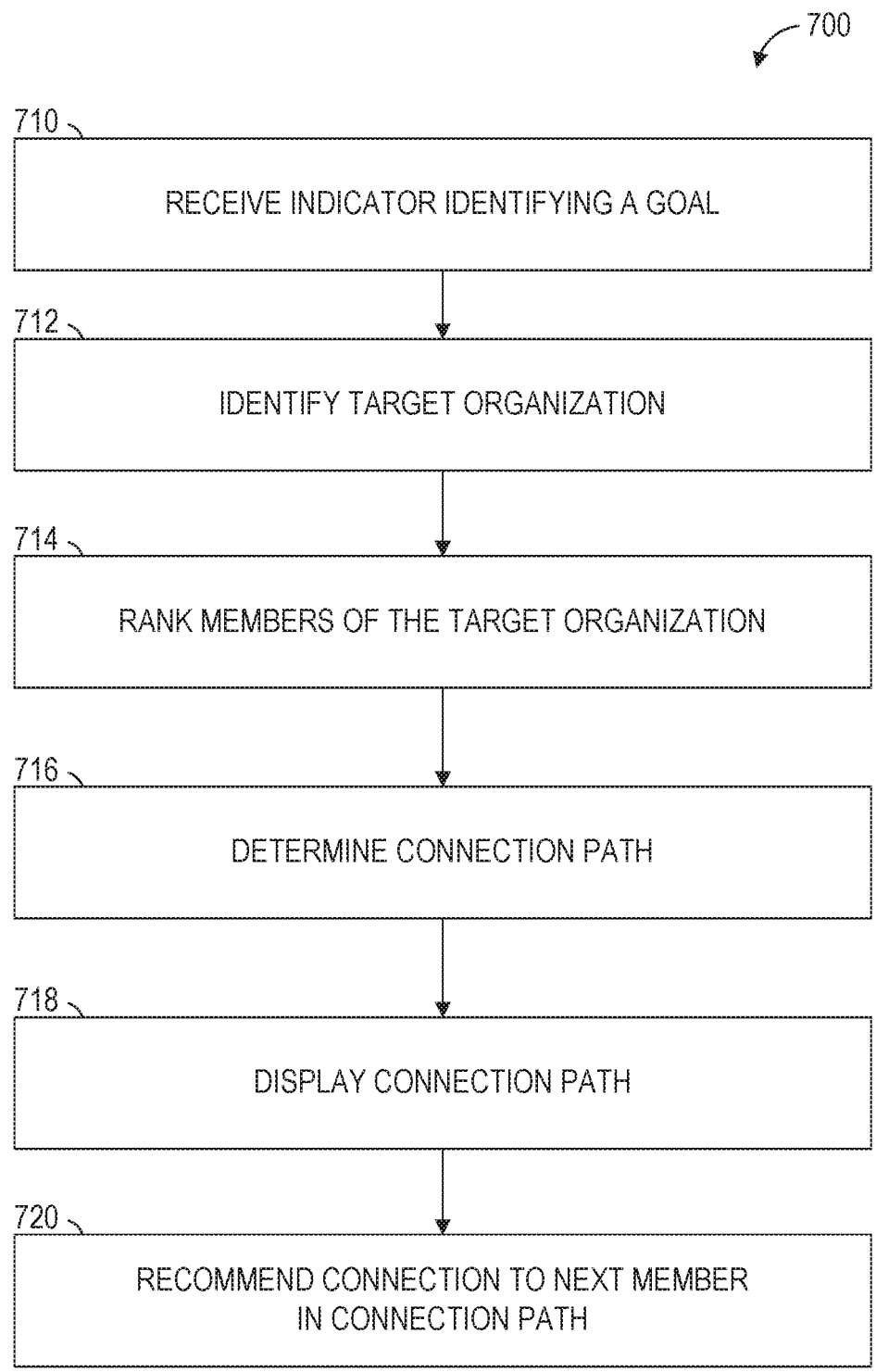
FIG. 7 is flow chart diagram depicting another method of expanding a member's network, according to one example embodiment.

FIG. 7 is flow chart diagram depicting another method 700 of expanding a member's network, according to one example embodiment. Operations in the method 700 may be performed by modules described in FIG. 2 and are described by reference thereto.

In one example embodiment, the method 700 begins and at operation 710 the request module 220 receives, from a member of an online social networking service (e.g., the online social networking service 100), an indicator that identifies a goal. In one example, the member specifically identifies a target organization at the online social networking service 100 by providing the name of the target organization. In response, the request module 220 looks up the name in the database 110.

The method 700 continues at operation 712 and the request module 220 identifies a target organization at the online social networking service 100 to satisfy the goal. In one example, the request module 220 electronically, communicates with the database 110 to identify member organizations.

The method 700 continues at operation 714 and the ranker module 240 ranks members of the online social networking service 100 that are also members of the target organization. In one example embodiment, the ranker module 240 scores each member of the target organization according to title, connection distance, and activity level (on the online social networking service 100) of members along the connection path. The ranker module 240 then ranks the members according to the respective scores.

The method 700 continues at operation 716 and the recommend module 260 determines a connection path, through members of the online social networking service 100, to one of the higher ranked members. In one example, the recommend module 260 determines a connection path to the highest ranked member of the target organization. In another example, the recommend module 260 determines a connection path to one of the members of the target organization that is more closely connected with another member with whom the member is currently communicating.

The method 700 continues at operation 718 and the recommend module 260 displays the connection path to the member. In one example, the recommend module 260 transmits an electronic signal to a computing device being used by the member to cause the computing device to display the connection path.

The method 700 continues at operation 720 and the recommend module 260 recommends, to the member, a connection to a next member identified by the connection path. In one example, the recommend module 260 determines that the connection path between the member and the member of the target organization is by way of members X, Y, and Z in that order. In response, the recommend module 260 recommends that the member connect to member X because member X is the next member along the connection path to the member of the target organization.

Figure 8:
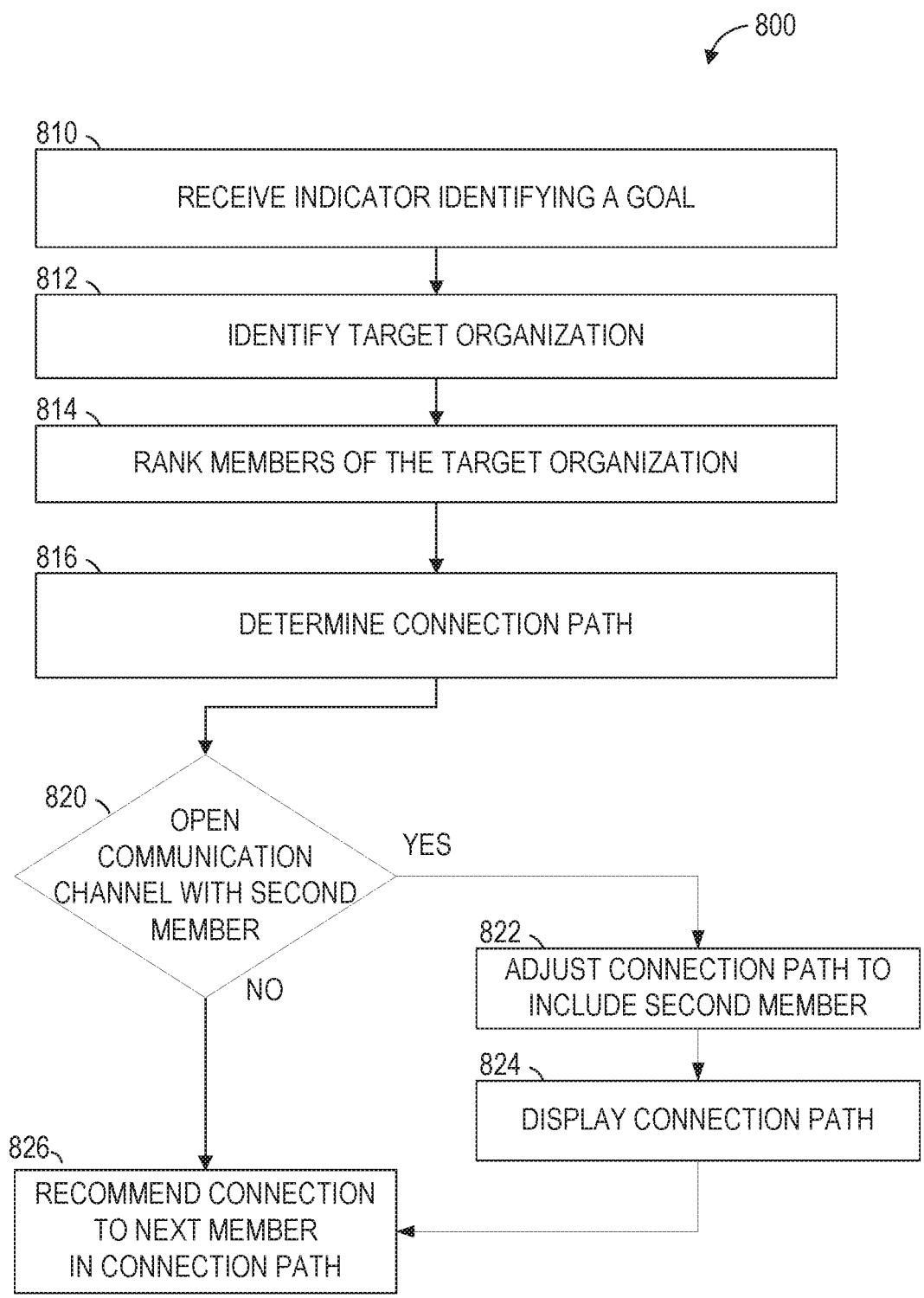
FIG. 8 is a flow chart diagram depicting one method of expanding a member's network, according to another example embodiment.

FIG. 8 is a flow chart diagram depicting one method 800 of expanding a member's electronic network, according to another example embodiment. Operations in the method 800 may be performed by modules described in FIG. 2 and are described by reference thereto.

In one example embodiment, the method 800 begins and at operation 810 the request module 220 receives, from a computing device being used by a member of an online social networking service (e.g., the online social networking service 100), an indicator that identifies a goal. The method 800 continues at operation 812 and the request module 220 identifies a target organization at the online social networking service 100 to satisfy the goal. The method 800 continues at operation 814 and the ranker module 240 ranks members of the online social networking service 100 that are also members of the target organization. In one example embodiment, the ranker module 240 scores each member of the target organization according to an average activity level of members along a connection path to the respective member of the target organization.

The method 800 continues at operation 816 and the recommend module 260 determines a connection path, through members of the online social networking service 100, to one of the higher ranked members as described herein. The method 800 continues at operation 820 and the recommend module 260 determines whether there is an open communication channel with a second member (e.g., member B). In response to there not being an open communication channel between the member and a second member, the method 800 continues at operation 826 and the recommend module 260 recommends that the member connect with a next member along the connection path In response to there being an open communication channel between the member and a second member, the method 800 continues from operation 820 to operation 822 and the recommend module 260 adjusts the connection path to include the second member. The method 800 continues at operation 824 and the recommend module 260 displays the adjusted connection path. The method 800 continues at operation 826 and the recommend module 260 recommends that the member connect with the next member along the adjusted connection path.

Modules Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-8 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Example Machine Architecture and Machine-Readable Medium

Figure 9:
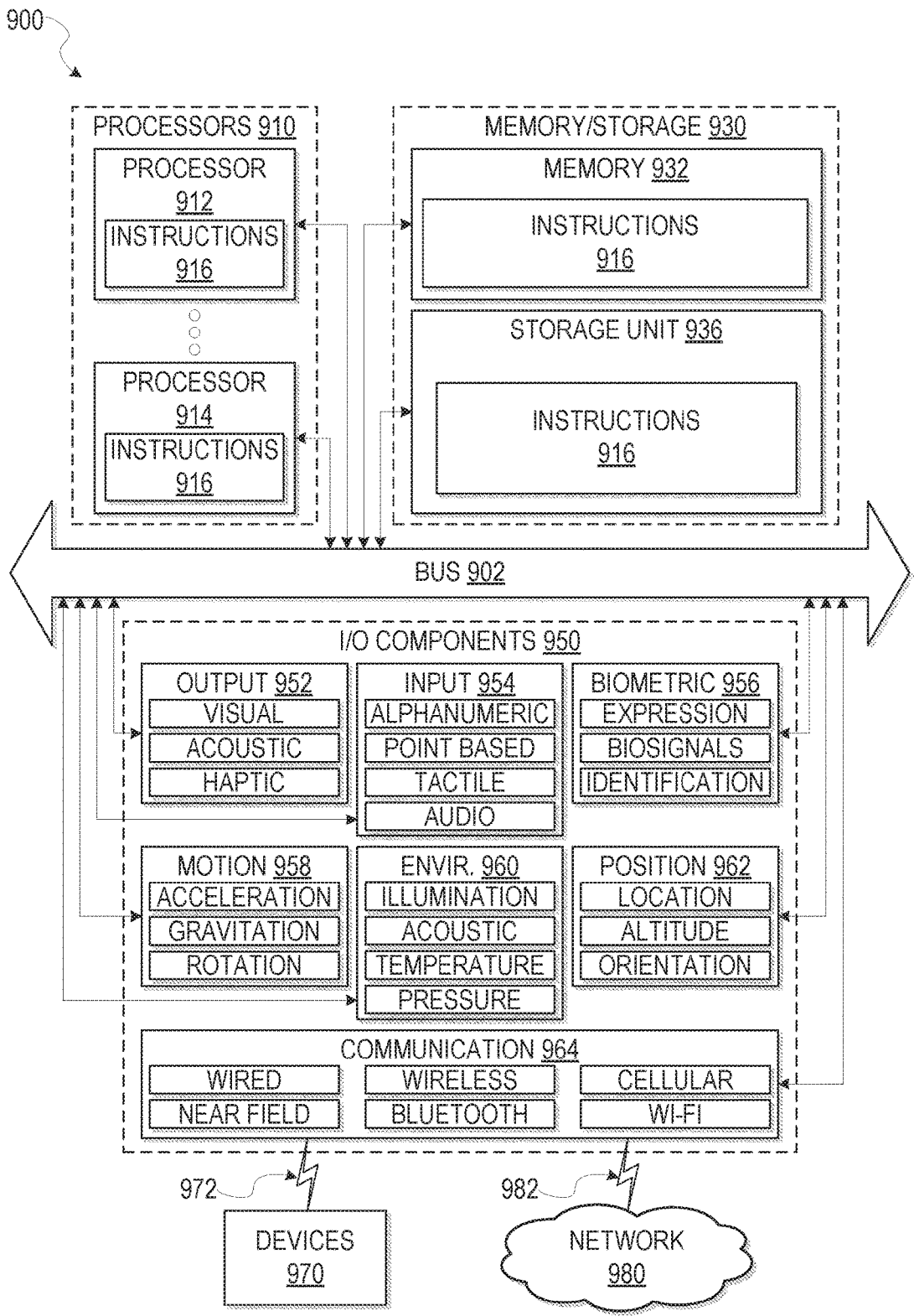
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of a machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the flow diagrams of FIGS. 6-8. Additionally, or alternatively, the instructions 916 may implement one or more of the components of FIG. 2. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a Central Processing Unit (CPU), a Reduced instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (MC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972, respectively. For example, the communication components 964 may include a network interface component or other suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a. Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more computer processors; and
   one or more computer-readable mediums storing instructions that, when executed by the one or more computer processors, cause the system to perform operations comprising:
   receiving, from a client device associated with a first member profile of an online social networking service, an indicator that identifies a goal of a user associated with the member profile, the goal indicating a desired action and a target industry;
   identifying, based on the target industry and organizational data for organizational member profiles of the online social networking service, a target organization that operates within the target industry and that has an organizational member profile of the online social networking service;
   identifying, based on the organizational member profile of the target organization, a set of member profiles associated with users employed by the target organization;
   for each member profile from the set of member profiles, determining an influence score indicating an estimated ability level of a user associated with the respective member profile to cause performance of the desired action, yielding a set of influence scores, each influence score determined based on data associated with each respective member profile from the set of member profiles;
   ranking the set of member profiles based on the set of influence score;
   selecting a target member profile based on the ranking;
   determining, based on connection data of the online social networking service, a connection path, from the first member profile to the target member profile, the connection data of the online social networking service indicating interconnections between member profiles of the online social networking service; and
   transmitting, to the client device associated with the first member profile, a recommendation to connect to a next member profile included in the connection path.

2. The system of claim 1, wherein the goal identifies the target organization.

3. The system of claim 1, wherein the client device displays the recommendation on a display of the client device.

4. The system of claim 1, wherein the influence score for each member profile is determined based on a title included in the respective member profile, the nature of network connections of the respective member profile, interactions with the online social networking service made by the user associated with the respective member profile, and a network connection strength between the user associated with the member profile and another user associated with another member profile from the set of member profiles.

5. The system of claim 1, wherein determining the connection path from the first member profile to the target member profile comprises:
   determining that there is an open communication channel between the first member profile and a second member profile is more closely connected to the target member profile members, the connection path including the second member profile.

6. The system of claim 1, wherein the influence score for each member profile is determined based on a determined network connection distance of the respective member profile from the target member profile.

7. The system of claim 1, wherein the influence score for each member profile is determined based on any indicators received from the user associated with respective member profile indicating that the user associated with the respective member profile to cause performance of the desired action.

8. A method comprising:
   receiving, from a client device associated with a first member profile of an online social networking service, an indicator that identifies a goal of a user associated with the member profile, the goal indicating a desired action and a target industry;
   identifying, based on the target industry and organizational data for organizational member profiles of the online social networking service, a target organization that operates within the target industry and that has an organizational member profile of the online social networking service;

identifying, based on the organizational member profile of the target organization, a set of member profiles associated with users employed by the target organization;

for each member profile from the set of member profiles, determining an influence score indicating an estimated ability level of a user associated with the respective member profile to cause performance of the desired action, yielding a set of influence scores, each influence score determined based on data associated with each respective member profile from the set of member profiles;

ranking the set of member profiles based on the set of influence score;

selecting a target member profile based on the ranking;

determining, based on connection data of the online social networking service, a connection path, from the first member profile to the target member profile, the connection data of the online social networking service indicating interconnections between member profiles of the online social networking service; and transmitting, to the client device associated with the first member profile, a recommendation to connect to a next member profile included in the connection path.

9. The method of claim 8, wherein the goal identifies the target organization.

10. The method of claim 8, wherein the client device displays the recommendation on a di splay of the client device.

11. The method of claim 8, wherein the influence score for each member profile is determined based on a title included in the respective member profile, the nature of network connections of the respective member profile, interactions with the online social networking service made by the user associated with the respective member profile, and a network connection strength between the user associated with the member profile and another user associated with another member profile from the set of member profiles.

12. The method of claim 8, wherein determining the connection path from the first member profile to the target member profile comprises:
determining that there is an open communication channel between the first member profile and a second member profile is more closely connected to the target member profile members, the connection path including the second member profile.

13. The method of claim 8, wherein the influence score for each member profile is determined based on a determined network connection distance of the respective member profile from the target member profile.

14. The method of claim 8, wherein the influence score for each member profile is determined based on any indicators received from the user associated with respective member profile indicating that the user associated with the respective member profile to cause performance of the desired action.

15. A non-transitory computer-readable medium storing instructions that, when execute by one or more computer processors of a computing device, cause the computing device to perform operations comprising:

receiving, from a client device associated with a first member profile of an online social networking service, an indicator that identifies a goal of a user associated with the member profile, the goal indicating a desired action and a target industry;

identifying, based on the target industry and organizational data for organizational member profiles of the online social networking service, a target organization that operates within the target industry and that has an organizational member profile of the online social networking service;

identifying, based on the organizational member profile of the target organization, a set of member profiles associated with users employed by the target organization;

for each member profile from the set of member profiles, determining an influence score indicating an estimated ability level of a user associated with the respective member profile to cause performance of the desired action, yielding a set of influence scores, each influence score determined based on data associated with each respective member profile from the set of member profiles;

ranking the set of member profiles based on the set of influence score;

selecting a target member profile based on the ranking;

determining, based on connection data of the online social networking service, a connection path, from the first member profile to the target member profile, the connection data of the online social networking service indicating interconnections between member profiles of the online social networking service; and transmitting, to the client device associated with the first member profile, a recommendation to connect to a next member profile included in the connection path.

16. The non-transitory computer-readable medium of claim 15, wherein the goal identifies the target organization.

17. The non-transitory computer-readable medium of claim 15, wherein the client device displays the recommendation on a display of the client device.

18. The non-transitory computer-readable medium of claim 15, wherein the influence score for each member profile is determined based on a title included in the respective member profile, the nature of network connections of the respective member profile, interactions with the online social networking service made by the user associated with the respective member profile, and a network connection strength between the user associated with the member profile and another user associated with another member profile from the set of member profiles.

19. The non-transitory computer-readable medium of claim 15, wherein determining the connection path from the first member profile to the target member profile comprises:
determining that there is an open communication channel between the first member profile and a second member profile is more closely connected to the target member profile members, the connection path including the second member profile.

20. The non-transitory computer-readable medium of claim 15, wherein the influence score for each member profile is determined based on a determined network connection distance of the respective member profile from the target member profile.

* * * * *

UNITED STATES PATENT AND TRADEMARK OFFICE
CERTIFICATE OF CORRECTION

| | | |
|---|---|---|
| PATENT NO. | : 10,491,557 B1 | Page 1 of 1 |
| APPLICATION NO. | : 15/499032 | |
| DATED | : November 26, 2019 | |
| INVENTOR(S) | : Lee et al. | |

It is certified that error appears in the above-identified patent and that said Letters Patent is hereby corrected as shown below:

In the Claims

In Column 19, Line 9, in Claim 8, delete "deteimining" and insert --determining-- therefor In Column 19, Line 32, in Claim 10, delete "di splay" and insert --display-- therefor Signed and Sealed this
Fifth Day of May, 2020

Andrei Iancu
*Director of the United States Patent and Trademark Office*